US012583436B2

(12) United States Patent
Kuwayama

(10) Patent No.: US 12,583,436 B2
(45) Date of Patent: Mar. 24, 2026

(54) HYBRID ELECTRIC VEHICLE

(71) Applicant: TOYOTA JIDOSHA KABUSHIKI KAISHA, Toyota (JP)

(72) Inventor: Shoichi Kuwayama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 18/887,216

(22) Filed: Sep. 17, 2024

(65) Prior Publication Data

US 2025/0196842 A1 Jun. 19, 2025

(30) Foreign Application Priority Data

Dec. 15, 2023 (JP) ................................. 2023-212279

(51) Int. Cl.
*B60W 20/00* (2016.01)
*B60W 20/13* (2016.01)
(52) U.S. Cl.
CPC ....... *B60W 20/13* (2016.01); *B60W 2510/081* (2013.01); *B60W 2510/083* (2013.01); *B60W 2510/1005* (2013.01); *B60W 2510/244* (2013.01)
(58) Field of Classification Search
CPC ........... B60W 20/13; B60W 2510/081; B60W 2510/083; B60W 2510/1005; B60W 2510/244; B60W 2540/10; B60W 10/02; B60W 10/06; B60W 10/08; B60W 20/40; Y02T 10/62
See application file for complete search history.

(56) References Cited

U.S. PATENT DOCUMENTS

| | | | | |
|---|---|---|---|---|
| 7,632,212 B2 * | 12/2009 | Yamanaka | ............ | B60W 10/08 |
| | | | | 477/110 |
| 9,440,641 B2 * | 9/2016 | Kitabatake | ............ | B60W 20/40 |
| 2015/0286199 A1 * | 10/2015 | Fushiki | .................... | B60L 3/12 |
| | | | | 700/295 |
| 2018/0111598 A1 * | 4/2018 | Jeong | .................... | B60W 10/06 |
| 2024/0140397 A1 * | 5/2024 | Park | .................... | B60W 20/40 |

FOREIGN PATENT DOCUMENTS

| | | | | | |
|---|---|---|---|---|---|
| CN | 116476801 A | * | 7/2023 | ............ | B60W 20/12 |
| EP | 2944494 A1 | * | 11/2015 | ............ | B60K 6/442 |
| JP | 2022-178038 A | | 12/2022 | | |

* cited by examiner

*Primary Examiner* — Russell Frejd
*Assistant Examiner* — Brittany Renee Peko
(74) *Attorney, Agent, or Firm* — SoraIP, Inc.

(57) ABSTRACT

Hybrid electric vehicle includes a control device that switches between hybrid-type driving and motor-type driving. The control device includes a setting unit configured to set a determination value based on a predicted upper limit value which is a predicted value of an output upper limit value of a battery when the start of the engine is completed during the running of the motor during the hybrid running. The setting unit sets, as the determination value, a vehicle speed at which a sufficient output value, which is a value obtained by adding a predetermined margin value to a necessary output value, becomes the predicted upper limit value. The required output value is an output value per unit time of the battery for each vehicle speed that can be maintained by the motor when starting of the engine is completed. The margin value decreases as the vehicle speed decreases.

4 Claims, 6 Drawing Sheets

THIS EXAMPLE

COMPARATIVE EXAMPLE

HYBRID ELECTRIC VEHICLE

CROSS-REFERENCE TO RELATED APPLICATION

This application claims priority to Japanese Patent Application No. 2023-212279 filed on Dec. 15, 2023, incorporated herein by reference in its entirety.

BACKGROUND

1. Technical Field

The present disclosure relates to a hybrid electric vehicle.

2. Description of Related Art

There is a hybrid electric vehicle that switches between hybrid travel in which the hybrid electric vehicle travels using power of an engine and motor travel in which the hybrid electric vehicle travels using power of a motor (see Japanese Unexamined Patent Application Publication No. 2022-178038 (JP 2022-178038 A), for example).

SUMMARY

At the time of a transition from the motor travel to the hybrid travel, the engine is started up by cranking the engine using the motor as a travel power source. Here, there is a possibility of the occurrence of hesitation in which the power of the motor is insufficient at the time of starting up the engine, resulting in a reduction in the acceleration of the hybrid electric vehicle, depending on the output upper limit value of the battery. Thus, when the output upper limit value of the battery during the hybrid travel is small, it is considered not to permit a transition from the hybrid travel to the motor travel but to continue the hybrid travel. If a transition to the motor travel is not permitted at an increased frequency, however, the driving time of the engine becomes long, and there is a possibility that the fuel consumption and the exhaust emission deteriorate.

The present disclosure provides a hybrid electric vehicle that ensures a transition to motor travel while suppressing hesitation.

An aspect provides a hybrid electric vehicle including:

an engine;

a clutch disposed on a power transfer path from the engine to wheels;

a motor disposed on the power transfer path from the clutch to the wheels and capable of starting up the engine by cranking the engine with the clutch engaged;

a battery that outputs power to the motor; and a control device that switches between hybrid travel in which the hybrid electric vehicle is driven by power of the engine with the clutch engaged and motor travel in which the hybrid electric vehicle is driven by power of the motor with the clutch disengaged, in which:

the control device includes a calculation unit that calculates, during the hybrid travel, a predicted upper limit value that is a predicted value of an output upper limit value of the battery at a time when startup of the engine by the motor is completed during the motor travel, a setting unit that sets a determination value based on the predicted upper limit value, and a determination unit that determines non-permission of a transition to the motor travel when a vehicle speed during the hybrid travel is more than the determination value, and that determines permission of a transition to the motor travel when the vehicle speed during the hybrid travel is equal to or less than the determination value;

the setting unit sets the vehicle speed at a time when a sufficient output value is the predicted upper limit value as the determination value;

the sufficient output value is a value obtained by adding a predetermined margin value to a required output value;

the required output value is an output value per unit time of the battery for each vehicle speed that allows the motor to maintain travel when the startup of the engine is completed;

the required output value decreases as the vehicle speed decreases; and the margin value decreases as the vehicle speed decreases. The hybrid electric vehicle may further include a transmission disposed on the power transfer path from the motor to the wheels, and the margin value may decrease as a gear ratio of the transmission increases.

The calculation unit may calculate the predicted upper limit value based on a state of charge (SOC) of the battery and an amount of consumed power in the battery since start until completion of the startup of the engine by the motor.

The calculation unit may calculate the amount of consumed power based on a rotational speed of the motor during the hybrid travel, torque of the motor required for the motor travel at the rotation speed of the motor, cranking torque required by the motor to crank the engine, and a cranking period that is a period from start of cranking of the engine by the motor until start of combustion in the engine.

It is possible to provide a hybrid electric vehicle that ensures a transition to motor travel while suppressing hesitation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Hybrid Electric Vehicle

Figure 1:
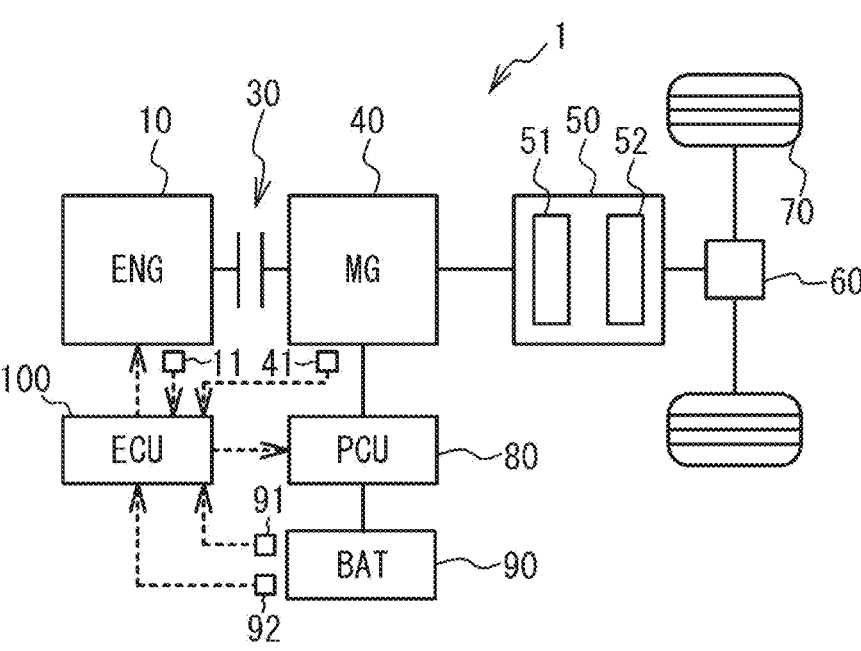
FIG. 1 is a schematic configuration diagram of a hybrid electric vehicle.

FIG. 1 is a schematic configuration diagram of a hybrid electric vehicle 1. In hybrid electric vehicle 1, a clutch 30, a motor 40, and a transmission 50 are provided in this order in a power transmission path from the engine 10 to the drive wheels 70. The engine 10 and the motor 40 are mounted as a driving source for traveling of hybrid electric vehicle 1. Engine 10 is, for example, a gasoline engine, but may also be a diesel engine. The transmission 50 and the left and right drive wheels 70 are connected via a differential gear 60. The transmission 50 includes a torque converter 51 and an automatic transmission 52. The automatic transmission 52 is a stepped transmission, but may be a continuously variable transmission.

The clutch 30 is provided between the engine 10 and the motor 40 on the same power transmission path. The clutch 30 receives the supply of the hydraulic pressure from the released state and is brought into an engaged state to connect the power transmission between the engine 10 and the motor 40. The clutch 30 is released in response to the stop of the hydraulic pressure supply, and shuts off the power transmission between the engine 10 and the motor 40.

The motor 40 is connected to the battery 90 via a PCU 80. The motor 40 functions as a driving power source of hybrid electric vehicle 1 in response to power supply from the battery 90. The motor 40 also functions as a generator that charges the battery 90 in response to power transmission from the engine 10 and the drive wheels 70. The motor 40 can start the engine 10 by cranking the engine 10 with the clutch 30 engaged.

PCU 80 is controlled by an ECU 100 which will be described later. In the power running operation in which the motor 40 outputs torque, PCU 80 converts the DC voltage of the battery 90 into an AC voltage and adjusts the electric power supplied to the motor 40. In the regenerative operation generated by the motor 40, PCU 80 converts the AC voltage from the motor 40 into a DC voltage and adjusts the regenerative power supplied to the battery 90.

Hybrid electric vehicle 1 is provided with an Electronic Control Unit (ECU) 100 as a control device for the same vehicle. ECU 100 is an electronic control unit including an arithmetic processing unit that performs various arithmetic processing related to travel control of vehicles, and a memory that stores control programs and data. ECU 100 is an exemplary hybrid electric vehicle 1 control device. ECU 100 is realized functionally by a calculation unit, a setting unit, and a determination unit, which will be described later in detail.

The oil temperature sensor 11, the rotation speed sensor 41, SOC sensor 91, and the temperature sensor 92 are electrically connected to ECU 100. The oil temperature sensor 11 detects the temperature of the lubricating oil of the engine 10. The rotation speed sensor 41 detects the rotation speed of the motor 40. SOC sensor 91 detects State of Charge (SOC) of the battery 90. The temperature sensor 92 detects the temperature of the battery 90. When SOC sensor 91 is not provided, ECU 100 may calculate SOC based on the current value and the voltage value of the battery 90.

ECU 100 drives hybrid electric vehicle 1 in either motor running or hybrid running. In the motor running, ECU 100 stops the engine 10, releases the clutch 30, and travels by the power of the motor 40. In the hybrid traveling, the clutch 30 is engaged and traveled by at least the power of the engine 10. In the hybrid driving, the driving of the engine 10 can be assisted by the output of the motor 40.

The switching between the motor running and the hybrid running is performed based on the required torque to hybrid electric vehicle 1 obtained from the vehicle speed and the accelerator operation amount. For example, when the required torque is less than the starting threshold value for starting the engine 10, the motor running in which the engine 10 is stopped is selected in order to improve the fuel efficiency. When the required torque is equal to or greater than the starting threshold value for starting the engine 10, the 15 hybrid travel in which the engine 10 is started is selected.

Motor Travel Transition Control

Figure 2:
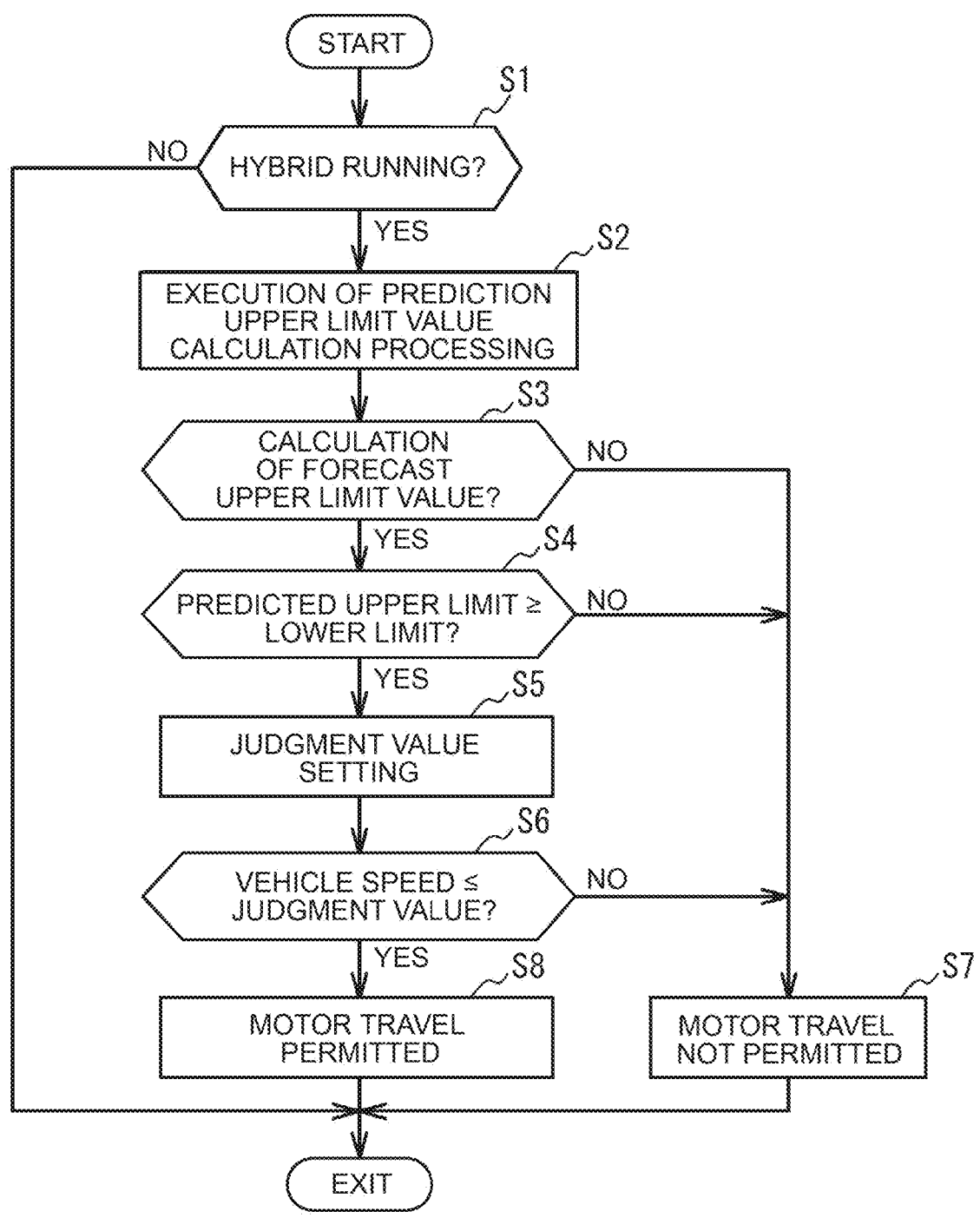
FIG. 2 is a flowchart illustrating motor travel transition control.

FIG. 2 is a flowchart illustrating the motor travel transition control. ECU 100 determines whether hybrid electric vehicle 1 is hybrid-running (S1). If S1 is No, this control ends.

If S1 is Yes, ECU 100 executes a calculation process for calculating the predicted upper limit of the battery 90 (S2). The predicted upper limit value is a predicted value of the output upper limit value of the battery 90 when the start of the engine 10 by the motor 40 is completed while the motor is running. The output upper limit value is an upper limit value that the battery 90 can output per unit time. Details of the calculation process will be described later. S2 is a process executed by the calculation unit.

Next, ECU 100 determines whether or not the predicted upper limit has been calculated (S3). If S3 is Yes, ECU 100 determines whether the predicted upper limit value is greater than or equal to the lower limit value (S4). The lower limit value will be described later. If S3 or S4 is No, ECU 100 will S7 the transition to motor travel.

Figure 3A:
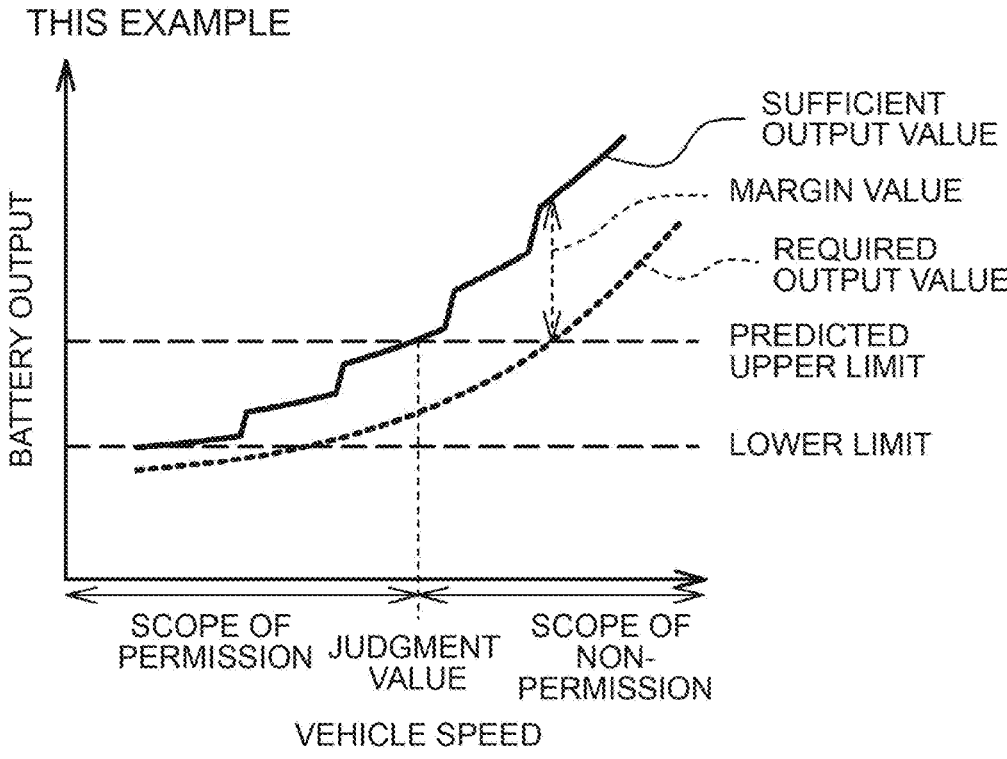
FIG. 3A is an illustrative view of a map defining the relation between vehicle speed and battery power in this embodiment.

If S4 is Yes, ECU 100 sets the decision (S5). The determination value is set as follows. FIG. 3A is a diagram illustrating a map that defines a relation between a vehicle speed and a battery power according to an embodiment of the present disclosure. This map is stored in advance in ROM of ECU 100. In FIG. 3A, the required output value and the sufficient output value are shown. The required output value is an output value per unit time of the battery 90 for each vehicle speed that can be maintained by the motor 40 when the start of the engine 10 is completed. The sufficient output value is a value obtained by adding a predetermined margin value to the necessary output value. The margin value is a value determined as appropriate in consideration of, for example, a variation in the output of the battery 90. The required output value decreases as the vehicle speed decreases. For this reason, the output value also decreases as the vehicle speed decreases. The vehicle speed in the case where the sufficient output value is the predicted upper limit value is set as the determination value. As described above, the sufficient output value decreases as the vehicle speed decreases. Therefore, the lower the predicted upper limit value of the battery 90 is, the lower the set determination value is. As will be described in detail later, the margin value also decreases as the vehicle speed decreases, and decreases as the gear ratio of the automatic transmission 52 increases. S5 is an exemplary process executed by the setting unit.

Note that the lower limit is shown in FIG. 3A. The lower limit value is a minimum value of a sufficient output value that is permitted to shift to motor travel. Therefore, when S4 is No as described above, the shift to the motor travel is not permitted (S7).

After S5 is executed, ECU 100 determines whether the vehicle speed of hybrid electric vehicle 1 is equal to or less than the determination value (S6). If S6 is No, ECU 100 determines not to allow the transition to motor travel (S7). If S6 is Yes, ECU 100 determines to allow transition to motor travel (S8). S7 and S8 are exemplary processes executed by the determination unit.

As shown in FIG. 3A, the lower the predicted upper limit value, the lower the determination value. In other words, the lower the predicted upper limit value is, the larger the non-permitted range in which the transition to the motor travel is not permitted. As a result, the hybrid traveling is continued, and the hedge during the transition from the motor traveling to the hybrid traveling can be suppressed.

Figure 3B:
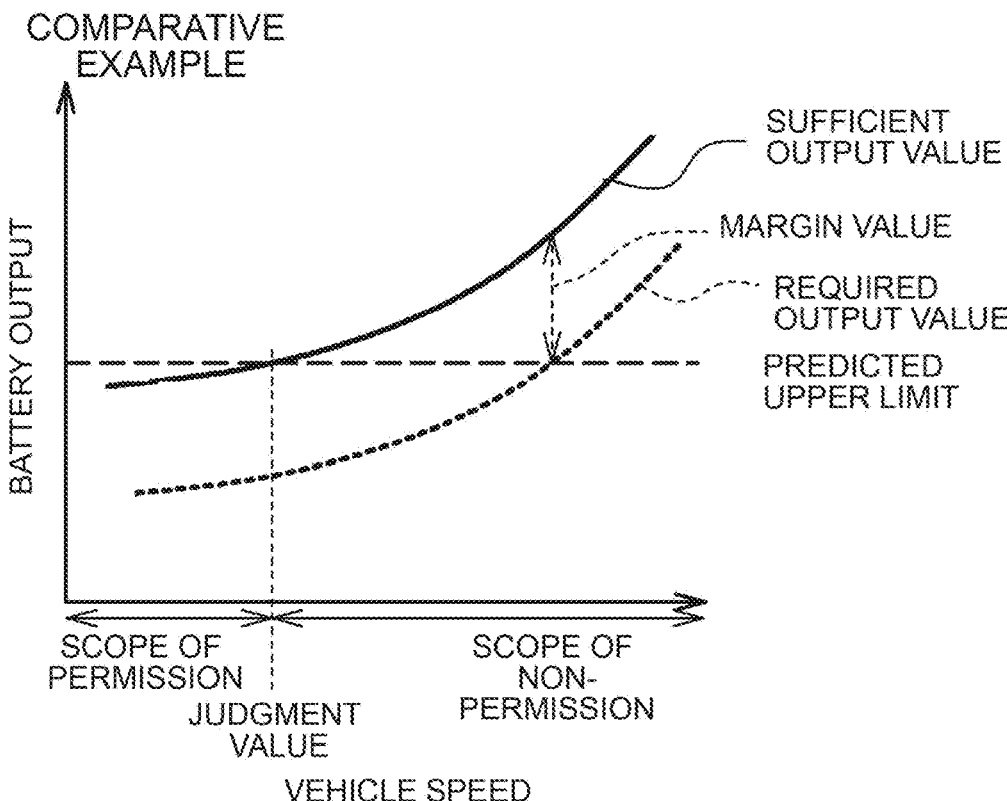
FIG. 3B illustrates an exemplary map defining the relationship between vehicle speed and battery power in a comparative example.

Here, a comparative example in which the margin value is constant will be described. FIG. 3B is an example of a map that defines the relation between the vehicle speed and the battery power in the comparative example. As shown in FIG. 3B, when the margin value is constant, the determination value is set as a lower value than in the present embodiment shown in FIG. 3A. Therefore, the permission range in which the shift to the motor travel in the comparative example is permitted is narrower than that in the present embodiment. When the vehicle speed of hybrid electric vehicle 1 is low, the acceleration with respect to the accelerator operation amount is large. That is, even if a hedge occurs at a low vehicle speed, acceleration can be immediately secured by an accelerator operation. For this reason, the driver is unlikely to feel the occurrence of hedge. Therefore, as shown in FIG. 3A, in the present embodiment, the lower the vehicle speed, the lower the margins. Accordingly, the shift to the motor travel is permitted within the range of the vehicle speed in which the driver is unlikely to feel the occurrence of the hedge.

Further, as shown in FIG. 3A, the larger the gear ratio of the automatic transmission 52 is, in other words, the lower the gear stage of the automatic transmission 52 is, the lower the margin is. This is because the acceleration with respect to the accelerator operation amount is larger as the gear stage is on the low-speed side, and the driver is less likely to feel the occurrence of the hedge. The shift to the motor travel is permitted in the range of the gear stage in which it is difficult for the driver to feel the occurrence of the hedge.

Figure 4:
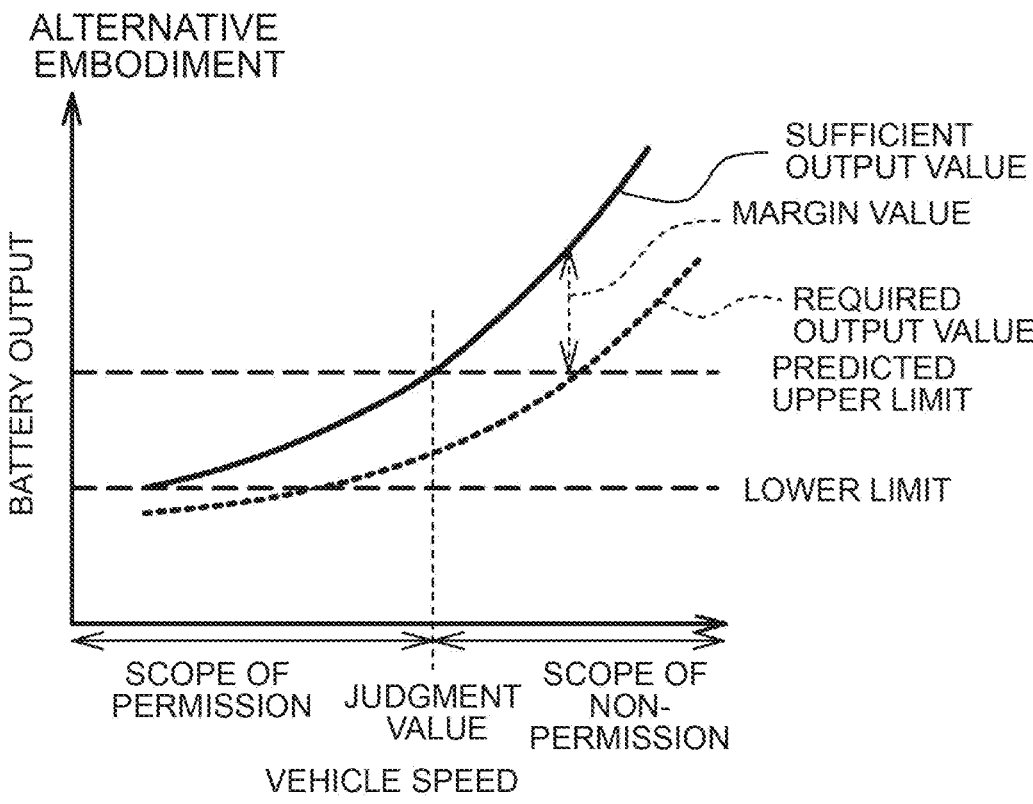
FIG. 4 is an exemplary diagram of a map defining a relationship between a vehicle speed and a battery output value in a modification.

FIG. 4 is an exemplary diagram of a map that defines a relationship between a vehicle speed and a battery output value in a modified example. In a variant, the automatic transmission 52 is a continuously variable transmission. In this case, as the gear ratio of the automatic transmission 52 increases, the margin value continuously decreases. This is because, in this case, as the gear ratio increases, the acceleration with respect to the accelerator operation amount increases, and the driver hardly feels the hedge.

Calculation Control of Predicted Upper Limit

Figure 5:
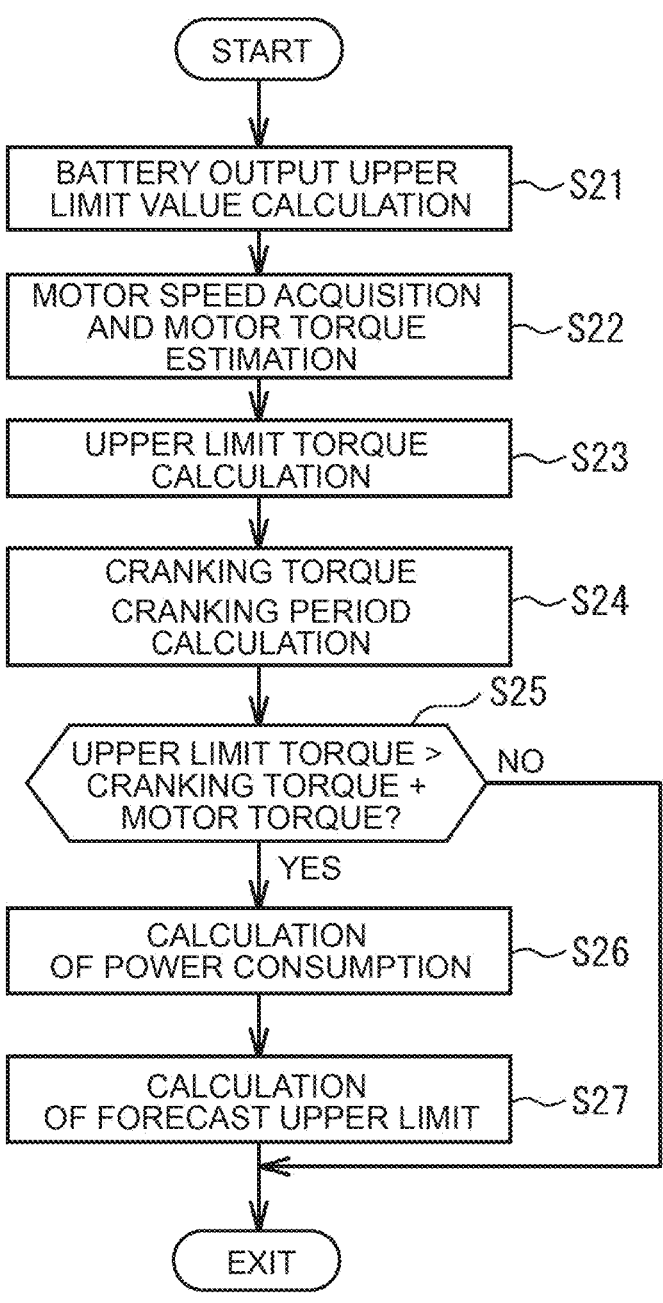
FIG. 5 is a flow chart exemplifying calculation control of a predicted upper limit.
Figure 6:
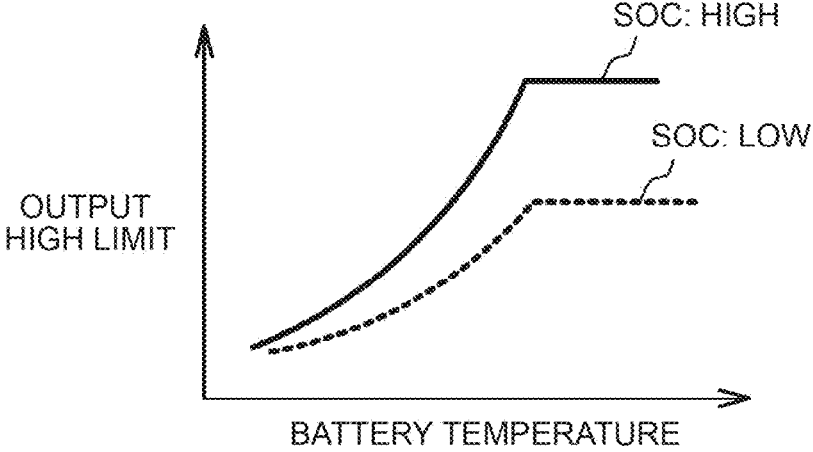
FIG. 6 is an exemplary diagram of a map defining an upper limit of power according to SOC and temperature of a battery.

Next, the above-described calculation control of the prediction upper limit value will be described. FIG. 5 is a flowchart illustrating calculation control of a prediction upper limit value. First, ECU 100 calculates an upper-output limit of the current battery 90 based on SOC and the temperature of the battery 90 (S21). FIG. 6 is an exemplary diagram of a map defining an upper limit of power according to SOC and temperature of the battery 90. FIG. 6 shows a case where SOC is high and a case where SOC is low. As shown in FIG. 6, the higher the temperature of the battery 90, the higher the output upper limit value of the battery 90 increases to a predetermined value. When the temperature of the battery 90 is equal to or higher than the predetermined value, the output upper limit value of the battery 90 becomes constant. In addition, the higher SOC, the higher the upper limit.

Next, ECU 100 acquires the motor rotational speed, which is the rotational speed of the current motor 40, and estimates the motor torque, which is the torque of the motor 40 required when the motor travels at the acquired motor rotational speed (S22). The estimation of the motor torque is estimated based on, for example, a map corresponding to the motor rotation speed.

Next, ECU 100 calculates an upper limit torque that can be output by the motor 40 based on the output upper limit value calculated by S21 and the motor rotational speed acquired by S22 (S23).

Next, ECU 100 calculates a cranking torque and a cranking duration required for cranking of the engine 10 by the motor 40 (S24). The cranking torque is calculated based on the temperature of the lubricating oil of the engine 10. The lower the temperature of the lubricating oil of the engine 10, the higher the cranking torque. The cranking period is a period from the start of cranking of the engine 10 by the motor 40 to the start of combustion in the engine 10. The cranking period is calculated based on the cranking tonnage and motor turnover.

Next, it is determined whether or not the upper limit torque calculated by S23 is larger than the sum of the cranking torque calculated by S24 and the motor torque estimated by S22 (S25). If S25 is No, this control ends. In this case, the predicted upper limit value is not calculated, and it is determined that the shift to the motor travel is not permitted.

If S25 is Yes, ECU 100 calculates the power dissipation of the battery 90 from the beginning to the completion of the starting of the engine 10 by the motor 40 (S26). The power consumption amount is the total power consumption amount by the motor 40, the auxiliary equipment, the air conditioner, and the like in the cranking period. The output value of the battery 90 per unit time is calculated based on the total value of the cranking torque and the motor torque. Next, the output value of the battery 90 per unit time by the auxiliary equipment or the air conditioner is calculated. The power consumption amount is calculated based on a value obtained by multiplying the total value of the output values by the cranking period.

Next, the predicted upper limit is calculated based on the power consumed by S26 (S27). Specifically, the electric power consumed is converted into an SOC. The converted SOC is then subtracted from SOC of the current battery 90. The output-upper-limit value calculated by referring to the map of FIG. 6 based on the subtracted SOC and the temperature of the battery 90 is calculated as the predicted-upper-limit value.

Although the embodiments of the present disclosure have been described in detail above, the present disclosure is not limited to such specific embodiments, and various modifications and changes can be made within the scope of the gist of the present disclosure described in the claims.

What is claimed is:

1. A hybrid electric vehicle comprising:
   an engine;
   a clutch disposed on a power transfer path from the engine to wheels;
   a motor disposed on the power transfer path from the clutch to the wheels and capable of starting up the engine by cranking the engine with the clutch engaged;
   a battery that outputs power to the motor; and
   a control device that switches between hybrid travel in which the hybrid electric vehicle is driven by power of the engine with the clutch engaged and motor travel in which the hybrid electric vehicle is driven by power of the motor with the clutch disengaged, wherein:

the control device includes a calculation unit that calculates, during the hybrid travel, a predicted upper limit value that is a predicted value of an output upper limit value of the battery at a time when startup of the engine by the motor is completed during the motor travel, a setting unit that sets a determination value based on the predicted upper limit value, and a determination unit that determines non-permission of a transition to the motor travel when a vehicle speed during the hybrid travel is more than the determination value, and that determines permission of a transition to the motor travel when the vehicle speed during the hybrid travel is equal to or less than the determination value;

the setting unit sets the vehicle speed at a time when a sufficient output value is the predicted upper limit value as the determination value;

the sufficient output value is a value obtained by adding a predetermined margin value to a required output value;

the required output value is an output value per unit time of the battery for each vehicle speed that allows the motor to maintain travel when the startup of the engine is completed;

the required output value decreases as the vehicle speed decreases; and the margin value decreases as the vehicle speed decreases.

2. The hybrid electric vehicle according to claim 1, further comprising a transmission disposed on the power transfer path from the motor to the wheels, wherein the margin value decreases as a gear ratio of the transmission increases.

3. The hybrid electric vehicle according to claim 1, wherein the calculation unit calculates the predicted upper limit value based on a state of charge (SOC) of the battery and an amount of consumed power in the battery since start until completion of the startup of the engine by the motor.

4. The hybrid electric vehicle according to claim 3, wherein the calculation unit calculates the amount of consumed power based on a rotational speed of the motor during the hybrid travel, torque of the motor required for the motor travel at the rotation speed of the motor, cranking torque required by the motor to crank the engine, and a cranking period that is a period from start of cranking of the engine by the motor until start of combustion in the engine.

\* \* \* \* \*